United States Patent
Backov et al.

(10) Patent No.: US 10,358,744 B2
(45) Date of Patent: Jul. 23, 2019

(54) METHOD FOR PREPARING MACROSCOPIC FIBRES OF TIO₂ BY CONTINUOUS ONE-WAY EXTRUSION, FIBRES OBTAINED AND USES

(71) Applicants: CENTRE NATIONAL DE LA RECHERCHE SCIENTIFIQUE, Paris (FR); UNIVERSITE DE BORDEAUX, Bordeaux (FR); UNIVERSITE DE PAU ET DES PAYS DE L'ADOUR, Pau (FR)

(72) Inventors: Renal Backov, Bordeaux-Cauderan (FR); Philippe Poulin, Talence (FR); Wilfrid Neri, Les Peintures (FR); Natacha Kinadjian, Castels (FR); Sylvie Lacombe-Lhoste, Pau (FR); Mickael Le Bechec, Pau (FR)

(73) Assignees: CENTRE NATIONAL DE LA RECHERCHE SCIENTIFIQUE, Paris (FR); UNIVERSITE DE BORDEAUX, Bordeaux (FR); UNIVERSITE DE PAUET DES PAYS DE L'ADOUR, Pau (FR)

( * ) Notice: Subject to any disclaimer, the term of this patent is extended or adjusted under 35 U.S.C. 154(b) by 201 days.

(21) Appl. No.: 15/301,447

(22) PCT Filed: Apr. 1, 2015

(86) PCT No.: PCT/FR2015/050843
§ 371 (c)(1),
(2) Date: Oct. 3, 2016

(87) PCT Pub. No.: WO2015/150701
PCT Pub. Date: Oct. 8, 2015

(65) Prior Publication Data
US 2017/0029979 A1 Feb. 2, 2017

(30) Foreign Application Priority Data

Apr. 3, 2014 (FR) ..................... 14 52984

(51) Int. Cl.
D01F 1/02 (2006.01)
D01F 9/08 (2006.01)
(Continued)

(52) U.S. Cl.
CPC ............. D01F 1/02 (2013.01); C04B 35/624 (2013.01); C04B 35/62259 (2013.01);
(Continued)

(58) Field of Classification Search
CPC ..... D01F 1/02; D01F 9/08; D01F 6/14; C04B 35/634; C04B 35/624; C04B 35/62259;
(Continued)

(56) References Cited

U.S. PATENT DOCUMENTS 3,155,632 A * 11/1964 Matsubayashi ......... C08L 29/04
524/459
4,222,977 A 9/1980 Dobo
(Continued)

FOREIGN PATENT DOCUMENTS

FR 2983850 6/2013
JP S62289615 12/1987
(Continued)

OTHER PUBLICATIONS

Search Report dated Jul. 30, 2015.
(Continued)

Primary Examiner — Nahida Sultana
(74) Attorney, Agent, or Firm — Ipsilon USA, LLP

(57) ABSTRACT

The invention relates to a method for manufacturing macroscopic fibers of titanium dioxide (TiO₂) by continuous extrusion in a one-way flow, to the macroscopic fibers of
(Continued)

TiO₂ that can be obtained by such a method, to the use of said fibers in heterogeneous photocatalysis for decontamination of organic pollutants from gaseous environments, and to a method for decontaminating gaseous environments, in particular air, using such fibers.

15 Claims, 4 Drawing Sheets

(51) Int. Cl.
  *C04B 35/622* (2006.01)
  *D02J 13/00* (2006.01)
  *D01D 1/02* (2006.01)
  *D01D 5/06* (2006.01)
  *D01F 6/14* (2006.01)
  *C04B 35/624* (2006.01)
  *C04B 35/634* (2006.01)

(52) U.S. Cl.
  CPC ............ *C04B 35/634* (2013.01); *D01D 1/02* (2013.01); *D01D 5/06* (2013.01); *D01F 6/14* (2013.01); *D01F 9/08* (2013.01); *D02J 13/00* (2013.01); *C04B 2235/5454* (2013.01); *C04B 2235/6021* (2013.01)

(58) Field of Classification Search
  CPC ..... C04B 2235/5454; C04B 2235/6021; D02J 13/00; D01D 5/06; D01D 1/02
  USPC ...................................... 264/176.1, 183, 184
  See application file for complete search history.

(56) References Cited

U.S. PATENT DOCUMENTS

| | | | | |
|---|---|---|---|---|
| 5,312,484 A | * | 5/1994 | Kaliski | ................. B82Y 30/00 106/416 |
| 7,569,254 B2 | * | 8/2009 | Rao | ....................... B82Y 30/00 427/385.5 |
| 9,580,867 B2 | * | 2/2017 | Mathur | ................. C09C 1/0093 |
| 2005/0054830 A1 | * | 3/2005 | Islam | ............... C07K 14/43513 530/353 |
| 2007/0116640 A1 | * | 5/2007 | Kim | ....................... B82Y 30/00 423/610 |
| 2008/0283465 A1 | * | 11/2008 | Liu | ..................... B01D 39/2024 210/496 |
| 2010/0009267 A1 | * | 1/2010 | Chase | ................ B01D 39/2082 429/320 |
| 2012/0064342 A1 | * | 3/2012 | Gagov | ............. C04B 35/62231 428/372 |

FOREIGN PATENT DOCUMENTS

| | | |
|---|---|---|
| JP | H06150827 | 5/1994 |
| JP | 2003064535 | 3/2003 |
| JP | 2010539342 | 12/2010 |

OTHER PUBLICATIONS

Photocatalytic TiO 2 Macroscopic Fibers Obtained Through Integrative Chemistry—Oct. 1, 2012.
Low temperature deposition of TiO2 thin films on polyvinyl alcohol fibers with photocatalytical and antibacterial activities—Dec. 20, 2007.
Phase-pure TiO2 nanoparticles: anatase, brookite and rutile—Apr. 9, 2008.

* cited by examiner 2 theta (degrees)

METHOD FOR PREPARING MACROSCOPIC FIBRES OF TIO₂ BY CONTINUOUS ONE-WAY EXTRUSION, FIBRES OBTAINED AND USES

RELATED APPLICATIONS

This application is a National Phase Application of PCT/FR2015/050843 filed on Apr. 1, 2015, which in turn claims the benefit of French Patent Application No. 14 52984, filed on Apr. 3, 2014 the entirety of which are incorporated herein by reference.

BACKGROUND

Field of the Invention

The present invention relates to a process for manufacturing macroscopic fibers of titanium dioxide ($TiO_2$) by continuous extrusion in unidirectional flow, to the macroscopic fibers of $TiO_2$ capable of being obtained by such a process, to the use of these fibers in heterogeneous photocatalysis for decontaminating gaseous media of organic pollutants and also to a process for decontaminating gaseous media, in particular air, using such fibers.

Description of Related Art

Since the discovery of the photocatalytic properties of titanium dioxide in 1972 by Fujishima, a great deal of work has been devoted to the development of materials based on $TiO_2$ and to the study of their photocatalytic properties, for applications in the environmental, fine chemistry or energy fields. These properties depend on those of the optionally modified titanium dioxide itself, but also on its interaction with the environment.

Photocatalysis is a multifaceted chemical process devoted to green chemistry, and more generally to the environment. The extent of the material-light interactions resulting from academic research and industrial developments is vast and should increase further since these interactions are put to good use to carry out photocatalyzed syntheses, the dissociation of water or even the photocatalytic decontamination of aqueous or gaseous media. In particular, the fields of photocatalysis in a heterogeneous medium have developed a lot in the course of the last four decades, encompassing applications in various fields such as semiconductor physics, surface science, materials science and chemical engineering.

The photocatalytic effect of $TiO_2$ in the solid state occurs when an exciton (the electron-hole pair generated by absorption of a photon having energy equal to or higher than the band gap of the semiconductor) may interact with the species adsorbed at the surface. The band gaps of the main polymorphs of $TiO_2$ are 3.0 eV for the rutile form and 3.2 eV for the crystalline anatase form, which is the most active in photocatalysis. These band gaps are such that the $TiO_2$ is mainly activated by UV-A rays and that it absorbs only a small fraction (5%) of the solar spectrum. The movements of the electrons and holes in $TiO_2$, a semiconductor nanomaterial, are governed by quantum confinement and the transport properties linked to the photons and phonons largely depend on the size and geometry of the materials. With the exception of its crystalline form, the photocatalytic properties of $TiO_2$ also depend on its specific surface area and on its mesoporosity.

Apart from these considerations of crystallinity and mesoporosity, $TiO_2$ may adopt various morphologies and may be for example in the form of powder, monoliths, nanofibers, or else coatings (nanostructured films).

Indeed, for environmental applications such as the elimination of toxic or dangerous substances in water or in air, one of the difficulties relates to the use of the material in powder form: in order to avoid the propagation of nanoparticles in the aqueous or gaseous effluent to be treated or in order to eliminate a tedious nanofiltration step, much work has been devoted to the deposition of nanomaterials on various supports (paper, glass, steel, textiles, polymers, membranes, ceramics, hollow beads, etc.). In particular, it has already been proposed to adsorb $TiO_2$ nanoparticles onto a fibrous material based on a fluorinated resin as described for example in patent application EP 0 950 731, or in a ceramic material as described for example in application EP 1 614 763.

It has also already been proposed to use $TiO_2$ in the form of nanotubes or nanofibers in which the high surface/volume ratio, the adsorption properties of various reactants and their specific morphology leading to a prolonged contact time with the pollutants had a positive effect on the photocatalytic properties of these materials. It is in this way that a process has for example been proposed, especially by Caruso, R. A. et al. ("*Titanium Dioxide Tubes from Sol-Gel Coating of Electrospun Polymer Fibers*", Adv. Mater., 2001, 13, 1577-1579), for preparing $TiO_2$ nanotubes by electrospinning which is a process that uses electrical energy to convert a solution based on polymer and on particles made of fibers having a nanoscale diameter which are then calcined in order to result in the $TiO_2$ nanotubes. Although offering a certain number of advantages such as simplicity, controllability, low production cost and processing that can be transposed to the industrial scale, the production of $TiO_2$ nanofibers by this process is not however completely satisfactory due to drawbacks inherent to the electrospinning technique. Specifically, the native fibers are dispersed randomly in the solution during their synthesis, which does not make it possible to obtain fibers that have a unidirectional arrangement at the macroscopic level, the fibers in the final state not being able in particular to be self-supported and having macroscopic cohesion defects due to the sintering imposed during heat treatment of the calcining step. Furthermore, such a process is not sufficiently reproducible from one synthesis to another, the fibers thus obtained not having standardized photocatalytic properties insofar as their surface roughness and their thickness are difficult to control.

It has already been proposed, especially in the article by Kinadjian N. et al. (Eur. J. Inorg. Chem., 2012, 5350-5359) to prepare macroscopic fibers of $TiO_2$ according to a process for rotary coextrusion of a sol prepared by heating an aqueous suspension of $TiO_2$ nanoparticles in the form of rods or spheres and polyvinyl alcohol particles in a beaker rotating at 25 revolutions per minute (rpm) containing a saturated solution of $Na_2SO_4$ at 45° C., by means of an injection syringe having a diameter of 300 µm, with an injection rate of 40 $mL.h^{-1}$. Bringing the sol into contact with the $Na_2SO_4$ solution brings about the solidification of the polyvinyl alcohol polymer and the formation of the fibers. After recovery in the beaker, the fibers are then calcined in order to eliminate the polyvinyl alcohol polymer. This process nevertheless has several drawbacks, in particular it results in $TiO_2$ fibers having a length that cannot exceed several centimeters and it cannot be transposed to the industrial scale. Furthermore, this process cannot be carried out continuously insofar as it is essential to regularly interrupt it to remove the fibers from the beaker in order to prevent them from ending up entangling or forming a ball. Furthermore, even after washing the fibers with distilled water, this process does not make it possible to completely eliminate the salt used to bring about the solidification of the polyvinyl alcohol polymer ($Na_2SO_4$). Moreover, the diameters of the yarns extruded by this technique cannot be too small for reasons of mechanical strength when they have left the bath. Finally, the time should be considered since this technique makes it possible at most to make 100 meters of yarn per day, which does not allow extension to the industrial scale.

OBJECTS AND SUMMARY

The objective of the invention is to propose a manufacturing process that can be easily transposed to the industrial scale, and that makes it possible to produce, in a reproducible and standardized manner from a point of view of their surface topology, macroscopic fibers that are much longer than those obtained using the rotary extrusion processes, while being substantially as efficient from a photocatalytic viewpoint as the silica fibers modified with $TiO_2$ that are currently available under the trade name Quartzel® PCO from the company Saint Gobain.

This objective is achieved by the process for preparing macroscopic fibers of $TiO_2$ that is the first subject of the invention and which will be described below.

The first subject of the present invention is a process for preparing a titanium dioxide macroscopic fiber continuously comprising the following steps:

i) the preparation of a dispersion of titanium dioxide nanoparticles in a solution of at least one vinyl alcohol polymer dissolved in a solvent, ii) the continuous and unidirectional extrusion of the dispersion obtained above in the preceding step in a coagulation bath suitable for giving rise to the solidification of said polymer, said extrusion being carried out by means of a, or a set of, cylindrical injection needle(s) having a diameter between 250 and 350 μm, in order to form a pre-fiber made of a composite material comprising the titanium dioxide nanoparticles and the solidified vinyl alcohol polymer, iii) the continuous extraction of the pre-fiber formed above in step ii) out of the coagulation bath, said extraction being carried out coaxially relative to the axis of extrusion of the dispersion in said coagulation bath, iv) the continuous washing of the pre-fiber extracted from the coagulation bath, v) the continuous drying of the pre-fiber from the preceding step in order to obtain a dry composite material fiber, vi) the elimination of the vinyl alcohol polymer by calcination of the dry composite material pre-fiber from the preceding step, in order to obtain a titanium dioxide macroscopic fiber.

By means of this process, it is now possible to produce, in a semi-industrial, reproducible and standardized manner, titanium dioxide macroscopic fibers, the length of which may range up to several hundreds of meters, said fibers having improved catalytic properties relative to the titanium dioxide fibers obtained by the processes from the prior art, and in particular relative to the titanium dioxide fibers obtained by a rotary extrusion process as described for example in the article by Kinadjian N. et al. (cited above), said photocatalytic properties being of the order of magnitude of those of the commercial fibers currently available on the market such as the Quartzel® PCO fibers from Saint Gobain.

For the purposes of the present invention, a titanium dioxide macroscopic fiber is understood to mean a filament having two mean dimensions orthogonal to its longitudinal axis, the first mean dimension (corresponding to its width) varying from 30 to 60 μm approximately, preferably from 40 to 50 μm approximately and the second mean dimension (corresponding to its thickness) varying from 10 to 40 μm approximately, preferably from 10 to 20 μm approximately.

The titanium dioxide nanoparticles used during step i) of the process in accordance with the invention are preferably spherical nanoparticles, the mean diameter of which varies from 2 to 15 nm, and even more particularly from 3 to 8 nm.

Such nanoparticles may in particular be prepared by precipitation from a solution of titanium alkoxide such as titanium tetraisopropoxide, in an alkaline medium, in the presence or absence of a surfactant such as for example a nonionic surfactant, according to the process previously described by Kinadjian N. et al. (cited above).

The amount of titanium dioxide nanoparticles within the dispersion prepared in step 1) preferably varies from 3% to 7% by weight and even more preferably from 4% to 5% by weight relative to the total weight of the dispersion.

The vinyl alcohol polymer used during step i) of the process in accordance with the invention may be a vinyl alcohol homopolymer or copolymer. Its molecular weight preferably varies from 5000 to 300 000 g·mol$^{-1}$, and even more preferentially from 150 000 to 250 000 g·mol$^{-1}$. It preferably has a degree of hydrolysis of greater than 95%, and even more preferentially of greater than or equal to 99%.

The amount of vinyl alcohol polymer within the dispersion prepared in step 1) preferably varies from 2% to 11% by weight and even more preferentially from 4% to 10% by weight relative to the total weight of the dispersion.

The solvent used during the preparation of the dispersion in step 1) of the process is preferably selected from water, ethanol, isopropanol and mixtures thereof. Among such solvents, water is very particularly preferred.

According to one particular embodiment of the process in accordance with the invention, step i) comprises the following substeps:

i1) the preparation of an aqueous dispersion of titanium dioxide nanoparticles, i2) the preparation of an aqueous dispersion of solid particles of a vinyl alcohol polymer, i3) the mixing of the dispersions obtained above in steps i1) and i2), in order to obtain a dispersion of titanium dioxide nanoparticles in a vinyl alcohol polymer solution.

According to this embodiment, the substep i3) is preferably carried out at a temperature varying from 50° C. to 60° C., so as to favor the dissolving of the vinyl alcohol polymer in water.

Furthermore, the dispersion of titanium dioxide nanoparticles prepared in step i) of the process in accordance with the invention may also contain spherical particles of a polymer material (latex). The addition of these particles to the dispersion makes it possible to create an additional porosity in the final structure of the titanium dioxide macroscopic fibers insofar as these particles are eliminated, in the same way as the vinyl alcohol polymer, during the calcination of the dry composite material pre-fiber of step vi).

The particles that can be used in the dispersion of step i), are preferably of nanoscale size, in particular their diameter varies from 100 to 300 nm. They may for example be selected from nanoparticles of polystyrene, polymethacrylate, polyethyl methacrylate, polybutadiene or else poly(styrenedivinylbenzene).

When they are used, the spherical particles of polymer material preferably represent from 0.3% to 3% by weight relative to the total weight of the dispersion.

Of course, the introduction of the spherical particles of polymer material into the dispersion should be carried out at a temperature below the melting point of the polymer that forms them so as to avoid the mixing thereof with the other constituents of the dispersion and to retain their spherical shape for the purpose of creating the anticipated porosity in the macroscopic fibers ultimately obtained at the end of the calcination of step vi). Thus, in practice, the spherical particles of polymer material are introduced into the dispersion after cooling the dispersion to a temperature of around 50° C.

The continuous and unidirectional extrusion step ii) of the process in accordance with the invention consists in continuously injecting the dispersion of step i) into a coagulation bath so as to bring about the almost immediate solidification of the vinyl alcohol polymer and to form a composite material pre-fiber comprising the titanium dioxide nanoparticles and the solidified vinyl alcohol polymer, said pre-fiber being in the form of a monofilament if only one injection needle was used, or a set of monofilaments if a set of needles was used.

According to the invention, the coagulation bath is preferably a solution of one or more salts in solution in a solvent.

The solvent of the coagulation bath may be selected from water, $C_{1-4}$ alcohols such as for example methanol and ethanol, a polyol, and mixtures thereof. Among these solvents, water is particularly preferred.

The salt or salts present in the coagulation bath have the role of inducing and/or facilitating the solidification of the vinyl alcohol polymer. They are preferably selected from sodium sulfate, ammonium sulfate, potassium sulfate, sodium carbonate, sodium hydroxide, potassium hydroxide and mixtures thereof. According to one particularly preferred embodiment of the invention, the coagulation bath is a saturated aqueous solution of sodium sulfate.

The temperature of the coagulation bath may vary from 30° C. to 55° C. approximately, and preferably from 35° C. to 50° C. approximately.

The extrusion of the dispersion during step ii) is preferably carried out by injecting an amount of dispersion that varies from 4 to 9 mL/h and even more preferentially from 5 to 7 mL/h. As indicated above, the diameter of the injection needle(s) varies between 250 and 350 μm, and even more preferentially is 300 μm. Taking into account the amount of dispersion injected and the diameter of the needles, it is possible to deduce therefrom that the injection rate of the dispersion into the coagulation bath varies from 1 to 1.9 m/min, and even more preferentially from 1.3 to 1.5 m/min. An injection rate of 1.3 m/min is very particularly suitable according to the invention.

The solidification of the vinyl alcohol polymer within the coagulation bath is very rapid and takes place practically immediately after the injection of the dispersion. However, in order to increase the solidity of the pre-fibers obtained during step ii), it is preferable for the contact time of the dispersion with the coagulation bath to be at least 30 seconds. Thus, according to one preferred embodiment of the invention, the contact time of the dispersion in the coagulation bath during step ii) varies from 30 seconds to 2 minutes approximately.

The extraction of the pre-fiber out of the coagulation bath during step iii) is also carried out continuously. It is particularly important that this extraction be carried out coaxially relative to the axis of extrusion of the dispersion in the coagulation bath, that is to say by retaining the same axis as the axis of injection of the dispersion in the coagulation bath so as to obtain titanium dioxide macroscopic fibers of long length and that have, at the end of the final calcination step, a surface topology referred to as "tree trunk" topology, that is to say comprising longitudinal surface striations, the main axis of which is itself parallel to the extrusion and extraction axes. The striations observed at the surface are in fact obtained during the process for extrusion of the dispersion of step i) in the coagulation bath, during which the chains of the vinyl alcohol polymer are aligned on a large scale by the shear imposed.

Step iv) of washing the fibers is preferably carried out by circulating the pre-fibers from the preceding step iii) in a washing bath preferentially comprising water.

The washing bath may also comprise one or more additives intended to limit the solubilization of the alcohol polymer in water and the excessive stretching of the composite material pre-fibers. Among such additives, mention may in particular be made of sodium tetraborate, for example at a concentration of 0.1 mol.l$^{-1}$ approximately.

The duration of the washing step iv), that is to say the contact time of the composite material pre-fibers with the washing bath, is at least 1 minute, this duration preferentially varying from 1 to 3 minutes approximately.

The step of drying the composite material pre-fibers during step v) may for example be carried out by exposing said pre-fibers to a temperature varying from 65° C. to 90° C., and even more preferentially from 75° C. to 85° C. The duration of the drying step may vary from 1 to 3 minutes approximately depending on the drying temperature used.

According to one preferred embodiment of the invention, the drying step is carried out by continuous passage of the pre-fibers between lamps that emit infrared radiation or else by passing through the chamber of a circulating gas furnace.

According to one particular and preferred embodiment of the invention, the process comprises two washing and drying cycles, that is to say that after a first drying step v), the pre-fibers from step v) again undergo the sequence of the washing step iv) then drying step v) as described previously.

According to one particular embodiment of the invention, the process may also comprise, between the drying step v) and step vi), a step of shaping the pre-fibers, for example by spinning, drawing, braiding or weaving, etc., in order to obtain an assembly of shaped, i.e. spun, drawn, braided or woven, pre-fibers. It is then this assembly of shaped pre-fibers that is subjected to step vi) of the process in accordance with the invention. According to this particular embodiment of the process, it is thus possible to acquire, after the calcination carried out in step vi), "technical" textiles (having germicidal properties, and properties of decontamination and of degradation in general of organic species).

Step vi) is carried out by calcination of the dry composite material pre-fibers from step v) and the aim of which is to eliminate the vinyl alcohol polymer and to bring about the crystallization of the titanium dioxide in anatase form. Step vi) is preferably carried out at a temperature varying from 350° C. to 500° C. approximately.

The calcination temperature, limited to 500° C., and preferably of the order of 450° C., makes it possible to obtain macroscopic fibers in which the titanium dioxide is in anatase form, calcination at a temperature above 500° C. would lead to the conversion of the anatase phase to rutile phase.

The duration of step vi) generally varies from 30 minutes to 7 hours approximately.

At the end of step vi), the titanium dioxide macroscopic fibers thus obtained are ready to be used, especially as photocatalyst.

The process in accordance with the invention may also comprise a step of winding and of hot drawing the composite material pre-fibers, said drawing step being carried out between the drying step and the winding step.

Thus, according to one particularly advantageous embodiment of the invention, the preparation process is carried out on a production line comprising, in unidirectional alignment and in this order, a station for injecting the dispersion of nanoparticles into a coagulation bath, a washing station, a drying station and a winding station comprising a reel connected to a means that makes it possible to rotate the reel at constant speed, such as for example a motor, one or more intermediate rolls being able to be placed between the washing station and the drying station in order to support and convey the fibers to the winding station, and a calcining station.

It is then sufficient to fasten the pre-fiber to the reel on leaving the drying station, then to set the reel in motion at a speed of rotation that is compatible with and adapted to the rate of injecting the dispersion prepared in step i) into the coagulation bath and to the speeds of the intermediate roll(s) placed between the washing and drying stations, so as to convey and wind the composite fibers continuously.

According to this embodiment, the speed of rotation of the reel is greater than the calculated rate of injecting the dispersion of nanoparticles into the coagulation bath, so as to give rise to a stretching of the pre-fibers of composite material on leaving the drying station and a reduction in their diameter. Thus, according to this embodiment, the speed of rotation of the reel varies from 2 to 4 m·min$^{-1}$ approximately.

According to one preferred embodiment of this variant, the stretch factor, that is to say the ratio between the diameter of the pre-fiber before stretching and the diameter of the pre-fiber after stretching varies from 2 to 2.5 approximately. Stretching also makes it possible to enhance the longitudinal surface striations that characterize the fibers in accordance with the invention.

A second subject of the present invention is also the titanium dioxide macroscopic fiber capable of being obtained by the implementation of the process as defined in the first subject of the invention.

It is characterized in that it consists of 85% to 90% of titanium dioxide in crystalline anatase form and of 10% to 15% of brookite, and in that it has:
 two mean dimensions orthogonal to their longitudinal axis, the first mean dimension (corresponding to their width) varying from 30 to 60 μm approximately, preferably from 40 to 50 μm approximately and the second mean dimension (corresponding to their thickness) varying from 10 to 40 μm approximately, preferably from 10 to 20 μm approximately;
 a macroscopic surface topology composed of a plurality of striations having a longitudinal axis parallel to the main axis of said fibers; and
 a structure comprising micropores and mesopores and the mean dimensions of which, as regards the mesopores, vary from 2 to 40 nm approximately.

In addition, said titanium dioxide macroscopic fiber has a specific surface area that may vary from 100 to 150 cm$^2$/g, and even more preferentially from 110 to 140 cm$^2$/g.

Said fibers have good mechanical properties despite the fact that they have orthogonal dimensions smaller than those of the fibers previously obtained by implementing the rotary extrusion preparation process as described for example in the article by Kinadjian N. et al. (cited above).

Another subject of the present invention is the use of the titanium dioxide macroscopic fibers obtained by the implementation of the process as defined in the first subject of the invention or as defined in the second subject of the invention, as photocatalyst, in particular for catalyzing the degradation of volatile organic compounds (VOCs) in a gaseous medium under the influence of UV irradiation.

This use may for example find an application for the decontamination and purification of air.

For this use, the fibers in accordance with the invention may be used in the form of continuous yarns consisting of an assembly of fibers.

Among the volatile organic compounds that can be degraded by the photocatalyst of the invention, mention may in particular be made of acetone, light alkanes, aromatic compounds (benzene, toluene, xylene, etc.), alcohols, aldehydes, etc.

A fourth subject of the present invention is therefore a process for decontaminating a gaseous medium capable of containing one or more volatile organic compounds using said titanium dioxide macroscopic fibers. This process is characterized in that the decontamination is carried out by bringing said gaseous medium into contact with said titanium dioxide macroscopic fibers under light irradiation at a wavelength centered around 365 nm (UV radiation).

According to this process, the photocatalysis of the VOCs is carried out at the surface of said fibers with a good photocatalytic efficiency. Furthermore, the degradation of the VOCs is observed instantaneously after UV irradiation, with no lag phase, and is stable over time.

According to one particular embodiment of the invention, the gaseous medium is passed over said fibers as a continuous flow.

DETAILED DESCRIPTION

Figure 1:
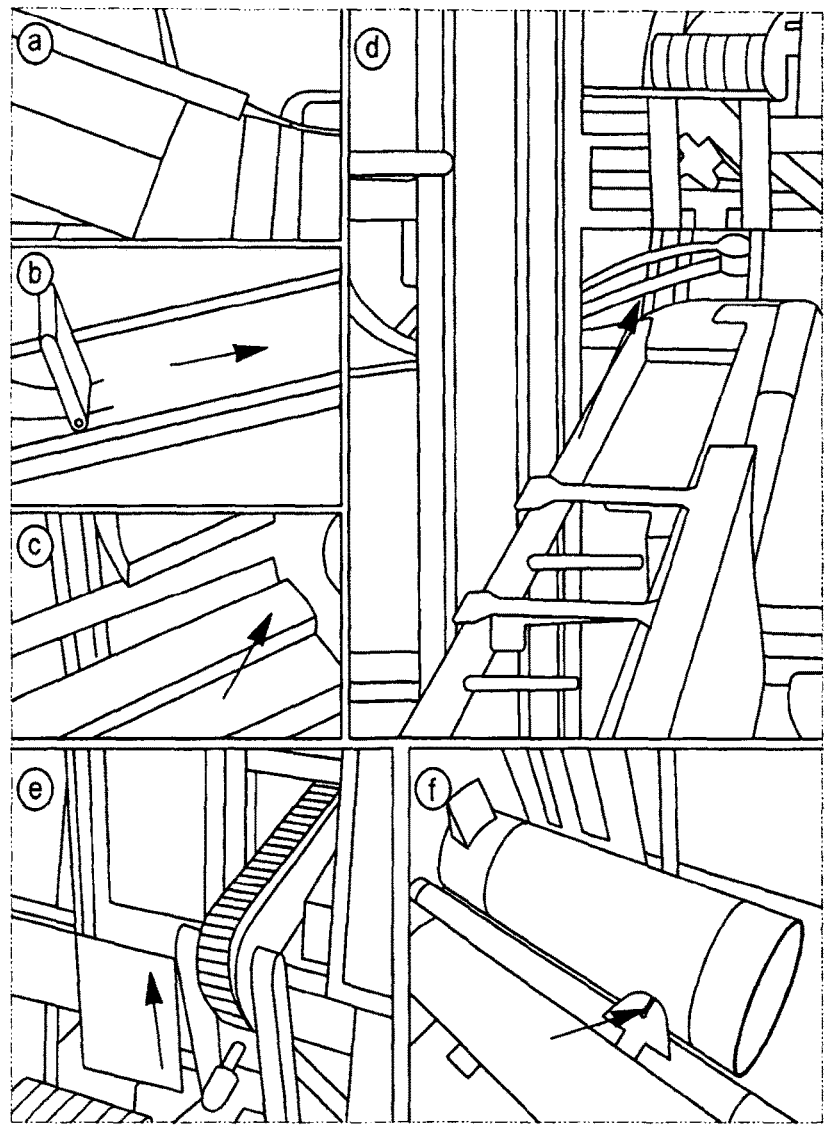
FIGS. 1a-1f are images of the various parts of the device used for carrying out the continuous unidirectional extrusion of the TiO$_2$ macroscopic fibers from example 1, in accordance with one embodiment.

The present invention is illustrated by the following exemplary embodiments, to which it is not however limited.

EXAMPLES

The raw materials used in the following examples are listed below:

titanium tetraisopropoxide at 98% (Ti(Oipr)$_4$), from Aldrich, hydrochloric acid at 37%, from Aldrich, nonylphenol ethoxylate containing 10 moles of ethylene oxide (nonionic surfactant), sold under the trade name Tergitol® NP-10 by Aldrich;

ammonia (NH$_4$OH); sodium sulfate (Na$_2$SO$_4$), from Aldrich, hydrolyzed polyvinyl alcohol (PVA), having a molar mass of 195 000, 99% pure, from Fluka.

The other chemicals and solvents used in the examples were all of analytical grade or HPLC grade.

These raw materials were used as received from the manufacturers, with no additional purification.

Characterizations:

The TiO$_2$ macroscopic fibers prepared in the following examples were characterized by various analytical methods in order to demonstrate their mesoporous nature, and their microstructures (crystallinities):

Scanning electron microscopy (SEM) observations were carried out using a scanning electron microscope sold under the reference 6700F by the company JEOL, operating at 10 kV or at 5 kV.

Specific surface area measurements and characterizations on the mesoscopic scale were carried out by nitrogen adsorption-desorption techniques using a machine sold under the name Micromeritics ASAP 2010 after degassing of the TiO$_2$ fibers at 150° C. under vacuum for 12 hours. The roughness of the TiO$_2$ fibers was evaluated by determination of the fractal surface dimension (Ds), which can be deduced from the curves of the nitrogen adsorption isotherms. Ds was calculated according to the procedure described by Avnir, D. and Jaroniec, M. ("*An Isotherm Equation for Adsorption on Fractal Surfaces of Heterogeneous Porous Materials.*", Langmuir, 1989, 5, 1431-1433). The experimental data of the adsorption isotherms are plotted on a graph using equation (1) below:

$$\theta = K[\log(P_0/P]^{-v} \quad (1)$$

in which:

v=3-Ds,

θ is the relative adsorption calculated from the normalized curve with the greatest adsorption value, K is a constant, which represents the ordinate at the origin of the function Log θ=f(Log[log(P$_0$/P]$^{-v}$); K=0.166, P$_0$ is atmospheric pressure (1 bar), P is the pressure at a time "t"; it is lower than the atmospheric pressure, Ds is the fractal surface dimension that it is desired to determine.

Ds may then easily be obtained by converting equation (1) to equation (2) below:

$$\text{Log}(\theta) = \log(K) - v \log(\log[P_0/P]) \quad (2)$$

Ds is deduced from the slope of the curve and may vary between 2 (non-rough surface) and 3. Thus, any value of Ds greater than 2 denotes an increase in the surface roughness. The adsorption range to be used for this analysis should be within the report range of the partial pressures P$_0$/P ranging from 0.05 to 0.3 (Avnir, D. and Jaroniec, M., cited above).

The crystalline structure of the TiO$_2$ was characterized by wide-angle X-ray diffraction via a diffractometer sold under the trade name PANalytical X'pert MPD in Bragg-Brentano θ-θ geometry, equipped with a graphite monochromator and an Anton-Paar HTK16 chamber (irradiation at the Cu Kα1 line, λCu, equal to 1.5418 Å (40 kV, 50 mA)).

Example 1: Preparation and Characterization of TiO$_2$ Macroscopic Fibers According to the Process in Accordance with the Invention In this example, TiO$_2$ macroscopic fibers were prepared according to the continuous unidirectional extrusion process that is the subject of the invention.

1.1. Synthesis of the TiO$_2$ Nanoparticles 5 mL of a 37 vol % (i.e. 12 M) solution of HCl were added to 50 mL of a 15 wt % aqueous solution of Tergitol® NP-10. The pH of the resulting solution was then adjusted to 1.8 by addition of NH$_4$OH. 6.4 mL of Ti(Oipr)$_4$ were then added slowly to said solution while stirring, the resulting mixture was left at room temperature. At the end of 12 hours approximately, a white precipitate of TiO$_2$ nanoparticles was formed and was recovered by evaporation of the liquid phase of the mixture. The powder of TiO$_2$ nanoparticles thus recovered was washed several times with deionized water so as to eliminate any trace of the nonionic surfactant.

1.2. Formulation of the Dispersions

An 8 wt % aqueous dispersion was prepared using the TiO$_2$ nanoparticles prepared above in step 1.1.

10 g of this aqueous dispersion were mixed with 10 g of a 12 wt % aqueous dispersion of PVA at a temperature of 80° C. in order to melt the PVA and obtain a PVA solution containing the TiO$_2$ nanoparticles.

1.3. Generation of the TiO$_2$ Macroscopic Fibers

A photograph of the various parts of the device used for carrying out the continuous unidirectional extrusion of the TiO$_2$ macroscopic fibers is given by the appended FIG. 1. The device is composed of:

- a syringe pump (FIG. 1*a*) attached to which is a syringe with a 300 μm diameter needle, filled with the solution of TiO$_2$ nanoparticles prepared above in step 1.2.;
- a coagulation bath filled with a saturated aqueous solution of Na$_2$SO$_4$, (i.e. around 320 g·L$^{-1}$ of Na$_2$SO$_4$) maintained at 40° C. (FIG. 1*b*, 1*c*);
- a washing bath filled with a 0.1 mol·L$^{-1}$ aqueous solution of sodium tetraborate (FIG. 1*d*);
- a drying element comprising two infrared lamps facing each other and arranged on each side of a conveyor belt having a Teflon® coating (FIG. 1*e*),
- a rotating take up roll that makes it possible to continuously wind the fibers leaving the drying element (FIG. 1*f*).

The syringe pump was used to inject the solution of TiO$_2$ nanoparticles into the coagulation bath at a rate of 6 mL/h, corresponding to a calculated linear injection rate of 1.4 m/min. The solution of TiO$_2$ nanoparticles coagulated immediately on leaving the syringe, as soon as it is injected into the coagulation bath, in the form of a continuous filament of a composite material formed of TiO$_2$ nanoparticles trapped in a solid PVA matrix (TiO$_2$-PVA). The minimum contact time of the TiO$_2$-PVA filaments with the Na$_2$SO$_4$ solution in the coagulation bath was set at 30 seconds in order to increase their mechanical stability.

The fibers were then passed through the washing bath in order to eliminate the Na$_2$SO$_4$ residues that may be present in the fibers after the coagulation. As the PVA is soluble in water, sodium tetraborate was added to the washing bath, the presence of which makes it possible to prevent the fibers from degrading and breaking during the washing step. The contact time of the TiO$_2$-PVA fibers with the washing bath was set at one minute approximately.

On leaving the washing bath, the $TiO_2$-PVA fibers were conveyed by the conveyor belt and dried at a temperature of 75° C. approximately by passing between the infrared lamps located on either side of the conveyor belt.

At the end of the drying zone, the fibers were stretched and raised from the conveyor belt and wound using the rotary take up roll set at one, the minimum speed of rotation of which is 3.2 m·min$^{-1}$. Insofar as the rate of injection leaving the syringe was 1.4 m·min$^{-1}$, it is possible to deduce therefrom that the corresponding minimum stretch factor during the whole of the process for manufacturing the $TiO_2$ macroscopic fibers was 2.3.

According to this process, it was possible to continuously manufacture several hundreds of meters of fibers of a $TiO_2$-PVA composite material.

A second washing of the $TiO_2$-PVA fibers was then carried out by unwinding the fibers and passing them into a water bath, followed by a second drying under the same conditions as before, prior to them again being wound onto the rotary take up roll. The purpose of this second session of washing/drying/winding of the fibers was to eliminate any residue of $Na_2SO_4$ and sodium tetraborate in the $TiO_2$-PVA composite material.

Finally, the $TiO_2$-PVA fibers were then calcined for 6 hours at 450° C., by applying a temperature rise rate of 5° C./min in order to eliminate the PVA and induce the crystallization of the $TiO_2$ in anatase form. $TiO_2$ macroscopic fibers were thus obtained that were then characterized.

1.4. Characterisations of the $TiO_2$ Macroscopic Fibers

Figure 2:
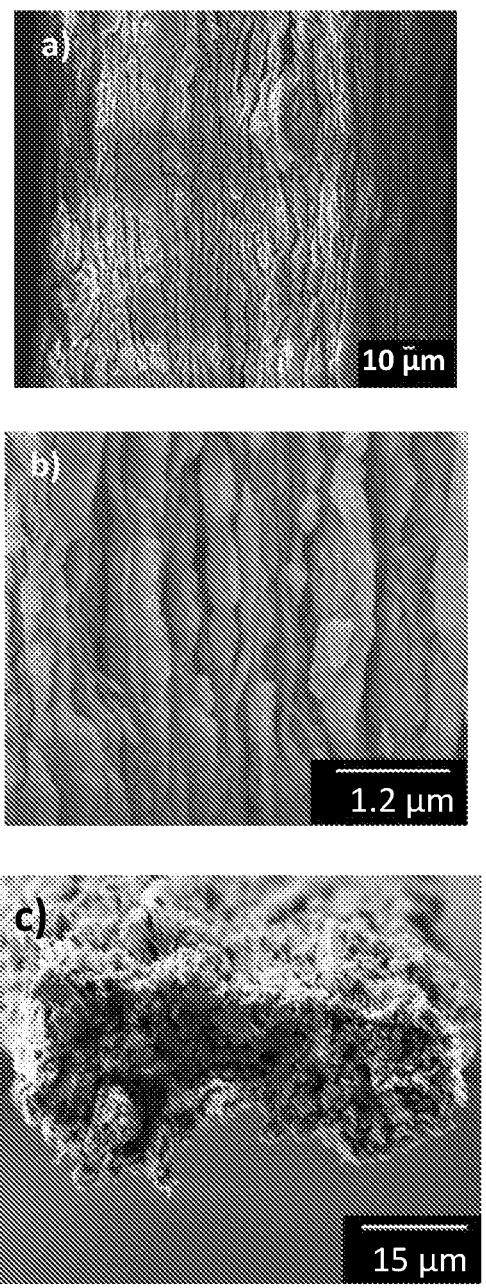
FIGS. 2a-2c are images of electron microscopy results of the fibers after calcination at various magnifications, from example 1, in accordance with one embodiment.

The electron microscopy results of the fibers after calcination are given by the appended FIG. 2 at various magnifications (FIGS. 2a: ×3000; 2b: ×25000 and 2c: ×2000).

Generally, the fibers have a flattened shape, with a width ranging from 30 to 60 μm, and more particularly from 40 to 47 μm, and a thickness ranging from 10 to 40 μm.

Their topology on the macroscopic scale is clearly different from those obtained by rotary extrusion according to the process previously described by Kinadjian N. et al. (cited above). Indeed, whereas the fibers obtained by rotary extrusion had a surface topology composed of honeycomb surface roughness (juxtaposition of pores), the $TiO_2$ fibers obtained by coaxial extrusion according to the process in accordance with the invention have a "tree trunk" topology, the fibers having a plurality of wide and deep, longitudinal surface striations oriented parallel to the main axis of the fibers. As the fibers are stretched, these striations result from the alignment of the PVA chains induced by the shear rate during the extrusion process.

Nitrogen adsorption/desorption measurements were used to characterize the porosity of the fibers and also their roughness on the mesoscopic scale. The corresponding results are given by appended FIGS. 3 and 4.

Figure 3:
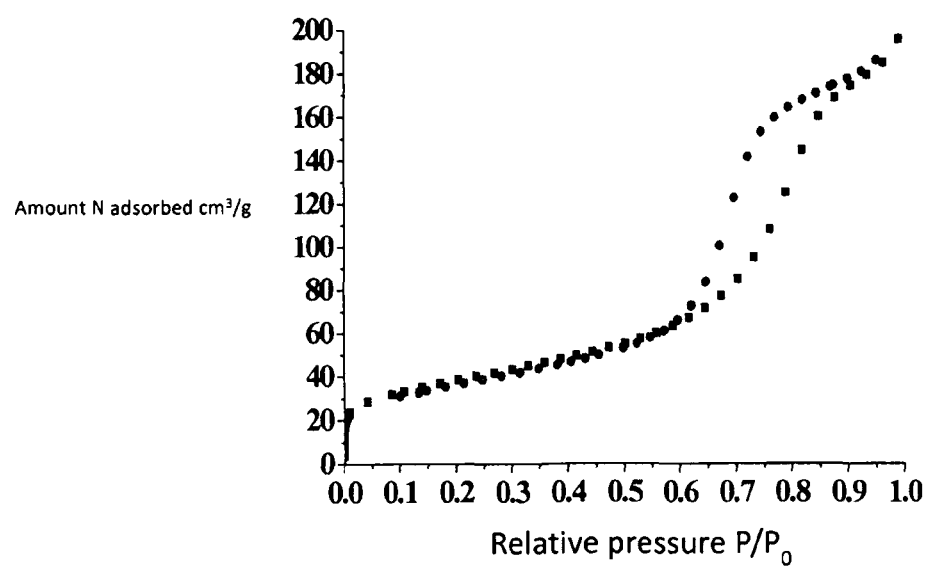
FIG. 3 is a graph of the amount of nitrogen adsorbed (in cm$^3$/g) as a function of the relative pressure (P/P$_0$), the solid circles corresponding to the desorption curves and the solid squares to the adsorption curves, taken from example 1, in accordance with one embodiment

FIG. 3 represents the amount of nitrogen adsorbed (in cm$^3$/g) as a function of the relative pressure (P/P$_0$), the solid circles corresponding to the desorption curves and the solid squares to the adsorption curves.

Figure 4:
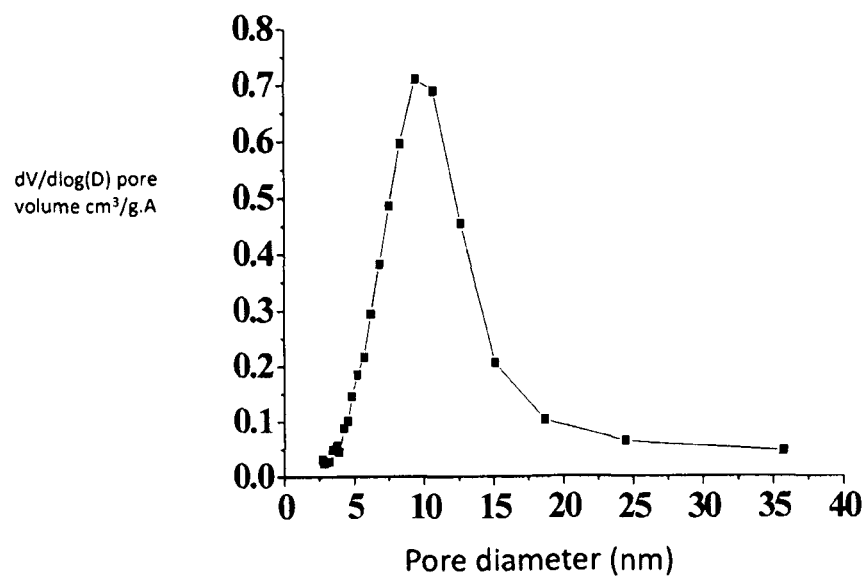
FIG. 4 is a graph of the dV/d log(D) ratio (in cm$^3$/g. Å) as a function of the pore diameter (in nm) from example 1, in accordance with one embodiment

FIG. 4 represents the dV/dlog(D) ratio (in cm$^3$/g. Å) as a function of the pore diameter (in nm). In the dV/dlog(D) ratio, V is the volume of nitrogen adsorbed at the interfaces and D represents the pore diameter.

These results show that the $TiO_2$ fibers obtained by the process in accordance with the invention have an adsorption profile representative of a type IV isotherm, and a distribution of the pore diameter in the mesopore range (between 2 and 37 nm approximately). The presence of the adsorption points at P/P$_0$<0.05 indicates that the fibers are also microporous.

The specific surface areas, calculated according to the B.E.T. and B.J.H. methods, and also the total pore volume and the surface roughness (Ds) values are presented in table 1 below:

TABLE 1

| B.E.T. specific surface area (m$^2$ · g$^{-1}$) | B.J.H. specific surface area (m$^2$ · g$^{-1}$) | Total pore volume (mL · g$^{-1}$) | Surface roughness (Ds) |
|---|---|---|---|
| 136 | 166 | 0.31 | 2.56 |

The pore size distribution, calculated according to the Barret-Joyner-Halenda (B.J.H.) equation from the desorption curves, indicates a pore size distribution between 6 and 18 nm.

Furthermore, the Ds value obtained (2.56) shows that the preparation process in accordance with the present invention makes it possible to achieve $TiO_2$ fibers that have a large surface roughness on the mesoscopic scale.

Figure 5:
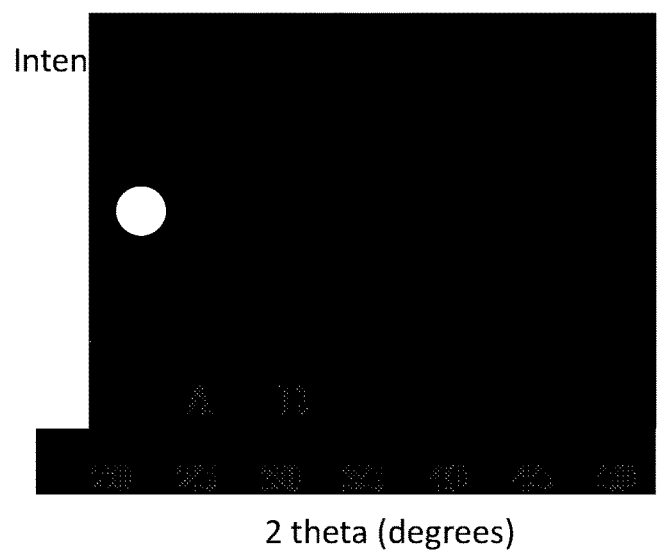
FIG. 5 is an x-ray diffraction result of the structure of the fibers on the microscopic scale where the intensity (in arbitrary units) is a function of the 2θ angle (in degrees), from example 1, in accordance with one embodiment

The structure of the fibers on the microscopic scale was studied by X-ray diffraction. The corresponding results are represented in the appended FIG. 5 on which the intensity (in arbitrary units) is a function of the 2θ angle (in degrees). These results indicate that the fibers are mainly composed of $TiO_2$ in the anatase phase (85-90%), with a small amount of brookite (10-15%). The amount of brookite present in the $TiO_2$ fibers obtained according to the process in accordance with the invention is greater than that present in the fibers obtained according to the rotary extrusion preparation process (Kinadjian N. et al., cited above). The X-ray diffraction results furthermore confirm that the washing operations carried out have made it possible to eliminate all traces of the salts used during the manufacture ($Na_2SO_4$ and sodium tetraborate).

Example 2: Study of the Photocatalytic Properties of the $TiO_2$ Macroscopic Fibers Obtained According to the Preparation Process in Accordance with the Invention In this example, the photocatalytic properties of the $TiO_2$ macroscopic fibers as prepared above in example 1 were studied.

2.1. Test Principle

In this example, the photocatalytic properties of the $TiO_2$ macroscopic fibers as prepared above in example 1 according to the process in accordance with the invention of coaxial extrusion (which are hereinafter referred to as F-$TiO_2$-extr.CoAx) were studied, in comparison, on the one hand, to those of a reference material, known for its excellent photocatalytic properties and consisting of anatase $TiO_2$ nanoparticles, supported by quartz fibers and sold under the trade name Quartzel® PCO by the company Saint Gobain (which are hereinafter referred to as F-$TiO_2$-Quartzel), and, on other hand, to those of $TiO_2$ macroscopic fibers obtained according to the rotary extrusion process as described by Kinadjian N. et al. (cited above), (which are hereinafter referred to as F-$TiO_2$-Extr-ROT).

The reaction used for the study of the photocatalytic properties of the various materials tested in this example is the mineralization of acetone, according to the following equation:

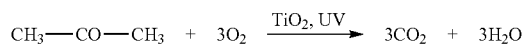

2.2. Experimental Device

Figure 6:
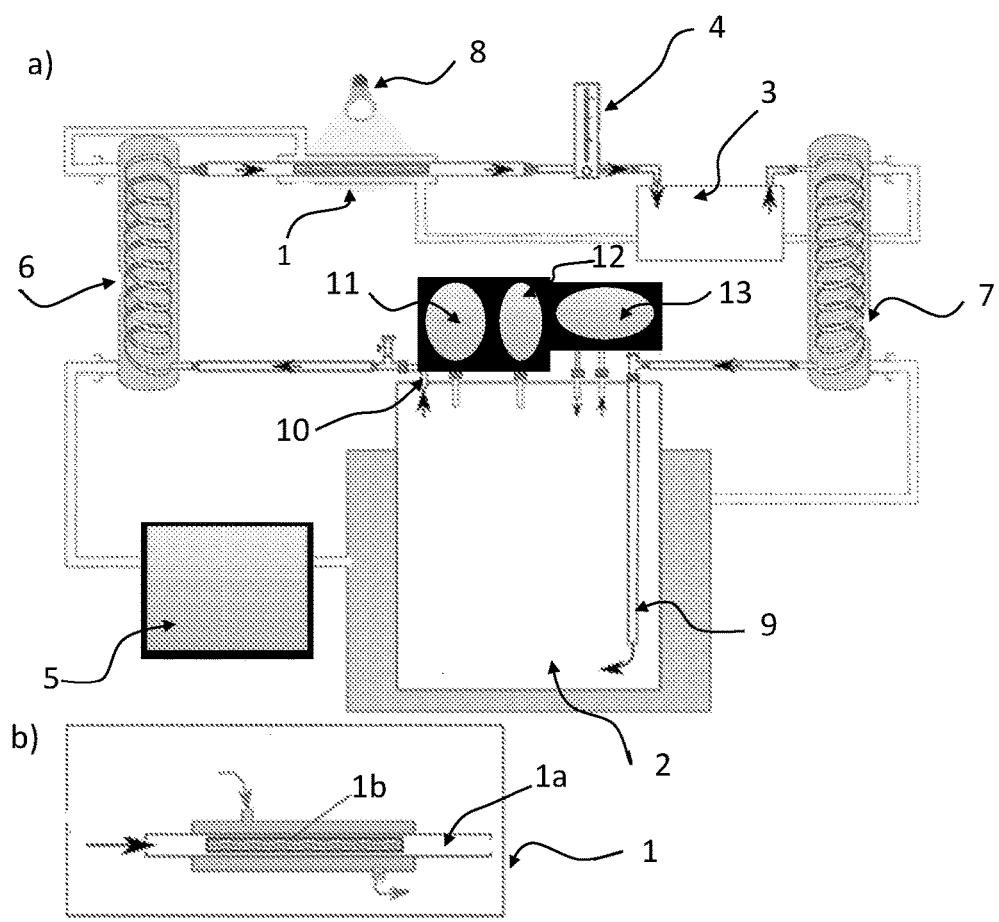
FIGS. 6a and 6b are diagrams of the device and cylindrical photoreactor used in example 2, in accordance with one embodiment.

The photocatalytic properties of the materials were studied on the device depicted in the appended FIG. 6 comprising in particular a cylindrical photoreactor 1 integrated into a circuit made of polytetrafluoroethylene (PTFE).

This device, represented in its entirety in FIG. 6a) is composed of a 17-liter thermoregulated gas (air) reservoir 2 connected to a circulation pump 3, the flow rate of which is controlled by a flowmeter 4. In order to limit the heating of the gas, thermoregulated columns 6,7 are positioned upstream and downstream of the circulation pump 3. The gas reservoir comprises an air inlet 9 and an air outlet 10 and is equipped with a manometer 11 and with a probe 12 that measures the temperature and the hygrometry in order to record the temperature and relative humidity of the gas circulating in the circuit throughout the duration of the experiment. The thermoregulation of the device was carried out by a water bath 5. The gas was sampled automatically and periodically through a pump (flow rate 10 L·min$^{-1}$) with the aid of a gas chromatograph 13 sold under the reference Varian 3800 GC with a flame ionization detector for the analysis of the volatile organic compounds (VOCs) and equipped with a katharometer detector for the analysis of the $CO_2$. The cylindrical photoreactor 1 is presented in detail in FIG. 6b and is composed of a thermoregulated pyrex column 1a comprising a water inlet 1b and a water outlet 1c and containing a Pyrex® capillary 1d having an internal diameter of 10 mm (known as a canister) containing the fibers to be tested for their photocatalytic properties. The flow rate of the gas in the circuit was around 0.7 m·s$^{-1}$ when the flowmeter 4 was set at 3.3 L·min$^{-1}$. Four fluorescent tubes 8 (Philips TLD8W) emitting at 366 nm are attached above the photoreactor 1, in order to deliver an irradiance of 3.2 mW/cm$^2$ as UV-A rays inside the reactor. The irradiance actually received by the fibers to be tested placed in the capillary 1b of the photoreactor 1 was less than 3.2 mW/cm$^2$ due to the absorbance of the Pyrex® walls of the thermoregulated column 1a and of the capillary 1b.

The photocatalytic properties of the TiO$_2$ fibers prepared according to example 1 above and those of the commercial Quartzel® PCO fibers were evaluated under strictly comparative conditions, the same procedure being followed in all the experiments.

Once the material to be tested was inserted in the photoreactor 1 (5 and 40 mg of fibers in each experiment), synthetic air was injected into the circuit and the relative humidity was adjusted to 15% by injecting the necessary amount of water into the circuit. The flow rate of the circulation pump 3 was set at 3.3 L·min$^{-1}$, corresponding to a gas flow rate in the circuit of 0.7 m·s$^{-1}$, which corresponds to the optimal conditions for carrying out the photocatalytic conversion of the acetone. The temperature of the circulating gas being 22° C.±2° C. The fibers are firstly irradiated for 20 hours under these conditions, without acetone in order to activate them and to evaluate the possible change in the amount of VOCs or CO$_2$ adsorbed. The chromatograph did not record any adsorption peak during this activation period. The lamps 8 were then switched off.

45 ppmv (2 µl) of acetone were then injected into the gas reservoir 2. The adsorption of acetone by the fibers to be tested was then monitored by chromatography using the gas chromatograph 13. When the concentration of gaseous acetone had stabilized, the lamps were switched on (t=0). The concentrations of acetone and CO$_2$ were determined and recorded every 7 minutes. Possible leaks of CO$_2$ and acetone were furthermore determined by operating the device without irradiation (less than 10% loss over 10 hours) and subtracted from the results obtained in the analysis phase of the fibers to be tested.

2.3. Results

The results obtained are presented in table 2 below, the photocatalytic efficiency of the fibers being determined by measuring the first-order reaction kinetics for the degradation of acetone and expressed in min$^{-1}$·g$^{-1}$:

TABLE 2

| Fibers tested | F—TiO$_2$-extr. CoAx | F—TiO$_2$- Quartzel (*) | F—TiO$_2$- Extr-ROT (*) |
|---|---|---|---|
| Diameter (µm) | 40 | 9 | 130 |
| Macroscopic surface topology | "tree trunk" striations" | TiO$_2$ nanoparticles deposited on quartz fibers | Juxtaposition of pores |
| Photocatalytic efficiency | 0.12 min$^{-1}$ · g$^{-1}$ | 0.15 min$^{-1}$ · g$^{-1}$ | 0.037 min$^{-1}$ · g$^{-1}$ |

(*) Fibers not in accordance with the invention

These results show that the TiO$_2$ macroscopic fibers obtained according to the coaxial extrusion preparation process in accordance with the invention (F-TiO$_2$-extr.CoAx) have a mean efficiency which is around 3 times higher than that of the TiO$_2$ macroscopic fibers obtained according to the rotary extrusion preparation process of the prior art (F-TiO$_2$-Extr-ROT), this efficiency being of the same order of magnitude as those of the F-TiO$_2$-Quartzel commercial fibers, which makes them competitive from an industrial and commercial viewpoint.

As is also indicated in table 2 above, the TiO$_2$ macroscopic fibers obtained according to the coaxial extrusion preparation process in accordance with the invention are essentially distinguished from the TiO$_2$ macroscopic fibers obtained according to the coaxial extrusion preparation process described in the document by Kinadjian N. et al. (cited above), by the fact that they have a diameter that is around 3 times smaller, of the order of 40 µm approximately (instead of 130 µm approximately) and a macroscopic surface topology that comprises longitudinal striations parallel to the longitudinal axis of the fibers and referred to as "tree trunk" topology (see appended FIG. 2).

It is therefore possible to conclude that the improvement in the catalytic properties of the TiO$_2$ macroscopic fibers obtained according to the process in accordance with the invention results from the modification of these characteristics (diameter and macroscopic surface topology).

Example 3: Photocatalytic Degradation of Toluene

In this example, the photocatalytic properties of the TiO$_2$ macroscopic fibers as prepared above in example 1 were studied with respect to the mineralization of toluene. By way of comparison, the F-TiO$_2$-Quartzel commercial fibers were also tested.

3.1. Test Principle

The reaction used in this example is the mineralization of toluene, according to the following equation:

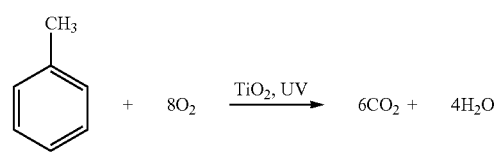

3.2. Experimental Device

The experiment was carried out on the same device as that used above in example 2 and under the same conditions, apart from the differences explained in detail below:

- the $TiO_2$ fibers prepared according to example 1 above (80 mg) and the Quartzel® PCO commercial fibers (80 mg) were entangled in the form of a mat having a diameter of 72 mm and a thickness of 10 mm. It is these mats of fibers, respectively referred to as F-$TiO_2$-extr.CoAx-Mat and F-$TiO_2$-Quartzel-Mat that were then placed in the photoreactor;
- cylindrical photoreactor having a diameter of 80 mm approximately and a height of around 200 mm, equipped with a Teflon® cover and two Swagelok® fittings. Inside this photoreactor, a porous glass disk that is horizontal, i.e. placed transversely to the vertical axis of the photoreactor, supports the mat of fibers to be tested;
- irradiation device composed of 4 light-emitting diodes (LEDs) (H2A1-H365-E 350 mA Roithner Lasertechnik) with a maximum at 350 nm, delivering an irradiance that may vary between 1 and 10 $mW/cm^2$ as UV-A rays inside the photoreactor;
- relative humidity adjusted to 20% by injecting the necessary amount of water into the circuit;
- injection of 100 ppmv of toluene into the gas reservoir 2 (i.e. 13 μl).

3.3. Results

The results obtained are presented in table 3 below, the photocatalytic efficiency of the fibers being determined by measuring the first-order reaction kinetics for the degradation of toluene and expressed in $ppmv.min^{-1}$:

TABLE 3

| Fibers tested | F—$TiO_2$-extr. CoAx-Mat | F—$TiO_2$-Quartzel-Mat (*) |
|---|---|---|
| Photocatalytic efficiency | 0.0011 ppmv · $min^{-1}$ | 0.0004 ppmv · $min^{-1}$ |

(*) Fibers not in accordance with the invention

These results show that the kinetics for the degradation of toluene are faster with the mat of entangled $TiO_2$ fibers in accordance with the invention than with the mat of entangled Quartzel® PCO commercial fibers not in accordance with the invention. Furthermore, around 30% only of the amount of toluene injected was mineralized after 500 minutes of irradiation with the mat of entangled Quartzel® PCO commercial fibers that is not part of the invention whereas with the mat of entangled $TiO_2$ fibers prepared according to example 1 and therefore in accordance with the invention, this percentage was 47%. Furthermore, the subsequent conversion of the toluene was virtually zero between 500 and 1200 minutes with the mat of entangled Quartzel® PCO commercial fibers not in accordance with the invention, whereas it reached 94% with the mat of entangled $TiO_2$ fibers prepared according to example 1.

Furthermore, observation of the fibers after the photocatalytic reaction (not represented) showed that the Quartzel® PCO commercial fibers had a yellow coloration and that black lumps were present between the entangled fibers. An intensive purification of 48 hours under irradiation in the reactor without pollutant (20% RH, clean air) was necessary in order to restore the initial color and activity of the mat of fibers. A contrario, the mat of fibers in accordance with the invention had, at the end of the toluene mineralization experiment, no yellow coloration and no black lumps, and led to the complete degradation of the toluene in 1500 min, without any sign of deactivation (continuous increase in the amount of $CO_2$ released).

The invention claimed is:

1. A process for preparing a titanium dioxide macroscopic fiber continuously comprising the following steps:
   i) the preparation of a dispersion of titanium dioxide nanoparticles in a solution of at least one vinyl alcohol polymer dissolved in a solvent,
   ii) the continuous and unidirectional extrusion of the dispersion obtained above in the preceding step in a coagulation bath suitable for giving rise to the solidification of at least some of said at least one vinyl alcohol polymer polymer, said extrusion being carried out by means of a, or a set of, cylindrical injection needle(s) having a diameter between 250 and 350 μm, in order to form a pre-fiber made of a composite material comprising the titanium dioxide nanoparticles and a solidified amount of said at least one vinyl alcohol polymer,
   iii) the continuous extraction of the pre-fiber formed above in step ii) out of the coagulation bath, said extraction being carried out coaxially relative to the axis of extrusion of the dispersion in said coagulation bath,
   iv) the continuous washing of the pre-fiber extracted from the coagulation bath,
   v) the continuous drying of the pre-fiber from the preceding step in order to obtain a dry composite material fiber,
   vi) the elimination of the solidified amount of said at least one vinyl alcohol polymer by calcination of the dry composite material pre-fiber from the preceding step, in order to obtain a titanium dioxide macroscopic fiber.

2. The process as claimed in claim 1, wherein the titanium dioxide nanoparticles used during step i) are spherical nanoparticles, the mean diameter of which varies from 2 to 15 nm.

3. The process as claimed in claim 1, wherein the amount of titanium dioxide nanoparticles within the dispersion prepared in step i) varies from 3% to 7% by weight relative to the total weight of the dispersion.

4. The process as claimed in claim 1, wherein the at least one vinyl alcohol polymer used during step i) is a vinyl alcohol homopolymer or copolymer, the molecular weight of which varies from 5000 to 300 000 $g·mol^{-1}$, $g·mol^{-1}$, and has a degree of hydrolysis of greater than 95%.

5. The process as claimed in claim 1, wherein the amount of the at least one vinyl alcohol polymer within the dispersion prepared in step 1) varies from 2% to 11% by weight relative to the total weight of the dispersion.

6. The process as claimed in claim 1, wherein step i) comprises the following substeps:
   i1) the preparation of an aqueous dispersion of titanium dioxide nanoparticles,
   i2) the preparation of an aqueous dispersion of solid particles of said at least one vinyl alcohol polymer,
   i3) the mixing of the dispersions obtained above in steps i1) and i2), in order to obtain a dispersion of titanium dioxide nanoparticles in a vinyl alcohol polymer solution.

7. The process as claimed in claim 1, wherein the dispersion of titanium dioxide nanoparticles prepared in step i) also contains spherical particles of a polymer material selected from nanoparticles of polystyrene, polymethacrylate, polyethyl methacrylate, polybutadiene and poly(styrene-divinylbenzene).

8. The process as claimed in claim 1, wherein the coagulation bath is a saturated aqueous solution of sodium sulfate.

9. The process as claimed in claim 1, wherein the injection rate of the dispersion into the coagulation bath varies from 1 to 1.9 m/min.

10. The process as claimed in claim 1, wherein the duration of the washing step iv) varies from 1 to 3 minutes.

11. The process as claimed in claim 1, wherein the step of drying the composite material pre-fibers during step v) is carried out by exposing said pre-fibers to a temperature varying from 65° C. to 90° C. for a duration of 1 to 3 minutes.

12. The process as claimed in claim 1, wherein said process also comprises, between the drying step v) and step vi), a step of shaping the pre-fibers, in order to obtain an assembly of shaped pre-fibers.

13. The process as claimed in claim 1, wherein step vi) is carried out at a temperature varying from 350° C. to 500° C.

14. The process as claimed in claim 1, wherein said process also comprises a step of winding and of hot drawing the composite material pre-fibers, said drawing step being carried out between the drying step and the winding step.

15. The process as claimed in claim 14, wherein said process is carried out on a production line comprising, in unidirectional alignment and in this order, a station for injecting the dispersion of nanoparticles into a coagulation bath, a washing station, a drying station and a winding station comprising a reel connected to a means that makes it possible to rotate the reel at constant speed, one or more intermediate rolls being able to be placed between the washing station and the drying station in order to support and convey the fibers to the winding station, and a calcining station.

* * * * *